United States Patent [19]

Labrum

[11] Patent Number: 5,013,055
[45] Date of Patent: May 7, 1991

[54] TOOL CADDY WITH SELF-CONTAINED POWER

[76] Inventor: Randall C. Labrum, 2862 Via Del Alazan, Bonita, Calif. 92002

[21] Appl. No.: 425,116

[22] Filed: Oct. 23, 1989

[51] Int. Cl.⁵ ................................................. B62B 1/26
[52] U.S. Cl. ..................... 280/47.19; 248/129; 280/47.24; 280/47.26; 312/209
[58] Field of Search ............... 280/47.19, 47.35, 47.26, 280/63, 47.24; 312/209; 180/53.8; 416/55; 248/129; 290/1 A, 1 B

[56] References Cited

U.S. PATENT DOCUMENTS

| | | | |
|---|---|---|---|
| 1,683,029 | 9/1928 | Fanger | 280/47.35 |
| 2,883,731 | 4/1959 | Wells | 280/47.19 |
| 2,964,328 | 12/1960 | Muir | 280/47.26 |
| 3,118,685 | 1/1964 | Jordan | 280/47.19 |
| 4,253,716 | 3/1981 | Turner, Jr. | 280/47.26 |
| 4,652,062 | 3/1987 | Greenwood | 312/209 |
| 4,759,560 | 7/1988 | Virgulti | 280/47.26 |
| 4,835,405 | 5/1989 | Clancey et al. | 290/1 B |
| 4,864,334 | 9/1989 | Ellis | 280/47.26 |

*Primary Examiner*—Andres Kashnikow
*Assistant Examiner*—Eric Culbreth
*Attorney, Agent, or Firm*—Ralph S. Branscomb

[57] ABSTRACT

A small, mobile, tool caddy is provided, characterized by having an on-board generator so that the power tools carried in the caddy can be operated anywhere. The caddy comprises a wheeled frame with some type of superstructure which will hold the power tools and hand tools needed in a particular profession, with the preferred or illustrated embodiment being a utility box mounted in the frame. The utility box has tool mounting brackets on its sides, front, and top, and also mounts a collapsible cloth refust bag just behind the utility box.

4 Claims, 1 Drawing Sheet

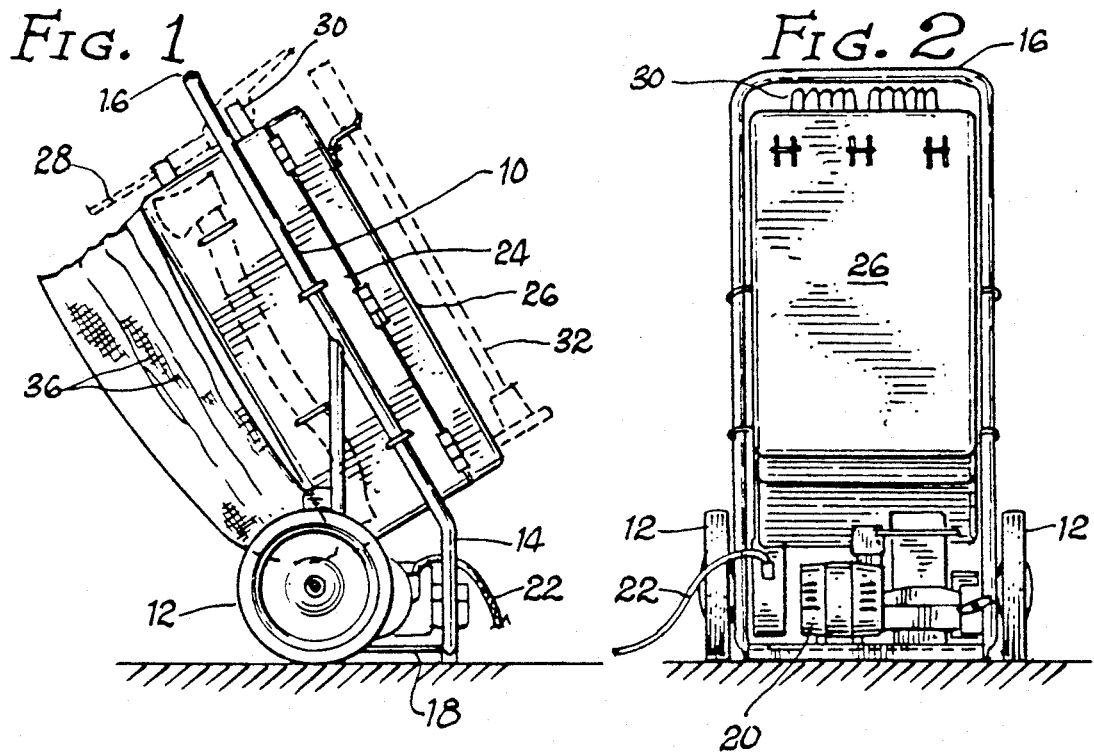
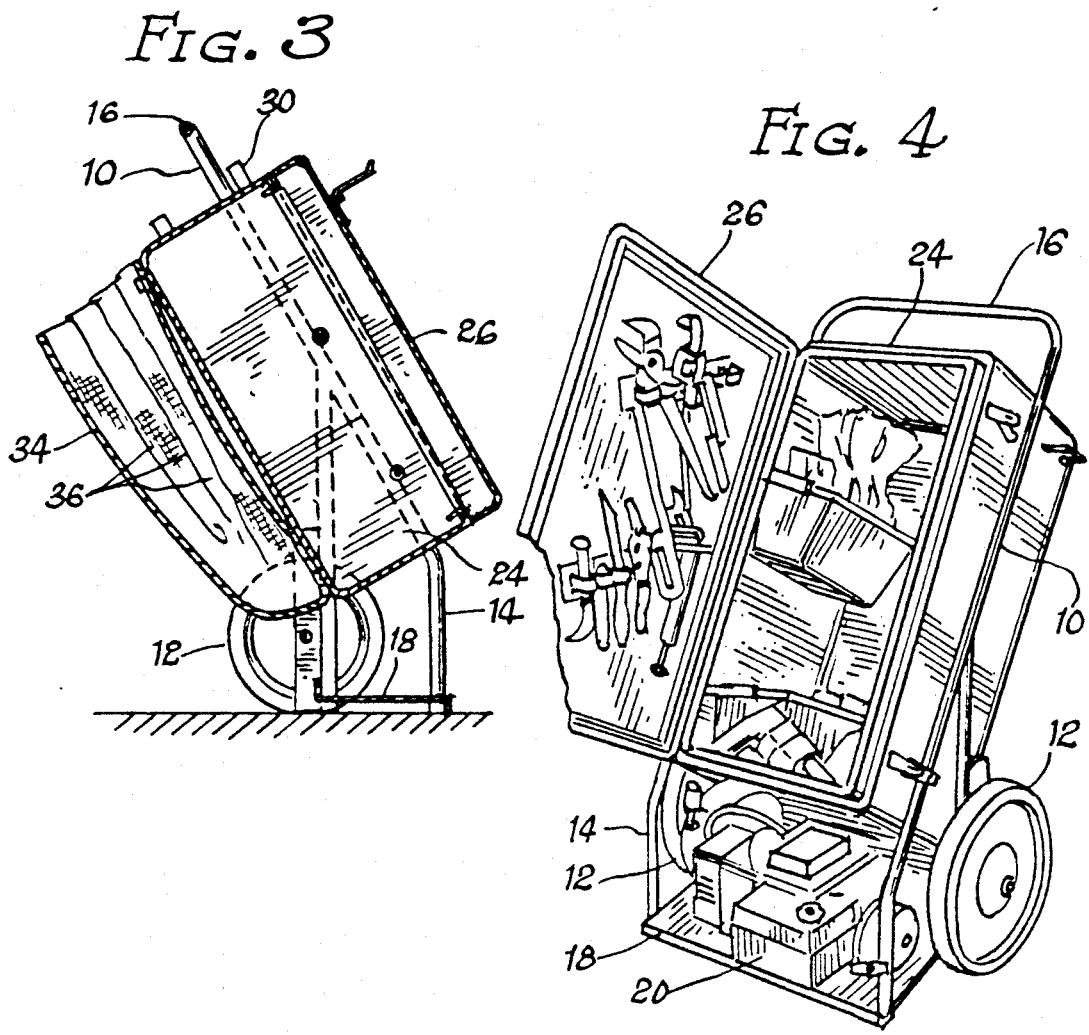

TOOL CADDY WITH SELF-CONTAINED POWER

BACKGROUND OF THE INVENTION

People in many different trades, as well as homeowners, are faced with the problem of providing power to an area remote from the house or building power that is available. In general, there are two choices available to them. First, they can use a series of long extension cords, with perhaps several hundred foot cords plugged in together, or, they can use gasoline powered tools.

Obviously, it is a nuisance to connect hundreds of feet worth of extension cords together to reach from available power to remote locations. The other alternative, of using gas powered tools, is multi-fold in nature. First, gasoline-powered tools are considerably more expensive than their electric counterparts. Secondly, gasoline powered tools make a lot more noise and are often irritating to neighbors when, for example, they are awakened at 7:00 A.M. by a gas-powered chain saw.

Third, electric appliances are considerably more reliable than gas-powered appliances, and they are also easier and cheaper to fix.

For these reasons, many people, such as gardeners, carpenters, and construction workers, must make a choice between two imperfect alternatives.

There is a need for a solution to this problem wherein electric power can be provided at a remote location in a convenient fashion, beyond the mere possibility of using a mobile gas-powered generator.

SUMMARY OF THE INVENTION

The present invention fulfills the above-stated need and provides a tool caddy which contains a gas-powered motor in its lower portion, and above provides a box, racks, and a bag, that will hold quite a number of tools. Alongside the generator is a retractable outlet which can be pulled out, for example, fifty to a hundred feet. If the user wants to trim a hedge, for example, he can push the unit out to one point in the hedge, pull out the extendable outlet, trim a hundred feet or so of the hedge, and then move the mobile unit on. This can be done with a number of different tools, and a number of different applications.

BRIEF DESCRIPTION OF THE DRAWINGS

FIG. 1 is side elevation view of the caddy, illustrating a grass whip in phantom mounted in the box door mounts;

FIG. 2 is a front elevation view of the caddy; and

FIG. 3 is a longitudinal vertical section through the caddy.

FIG. 4 is an isometric view from the front to side of the caddy.

DETAILED DESCRIPTION OF THE PREFERRED EMBODIMENT

The caddy has a main frame 1 which mounts two wheels 12 and defines two front feet 14 with the upper crossbar 16 being used as a handle to pull the caddy down into mobile position with the feet and wheels defining a plane so that the unit can be stable when in use.

The frame has a lower platform 18 mounted laterally between the lower frame members, which define a seat for the gas-powered generator 20. This small, gasoline-powered generator, could be any suitably sized unit. The electrical energy output of the gasoline engine is extended to the tools that the caddy carries through a retractable power cord 22.

Above the generator and the retractable power cord are various brackets and tool holders. There are obviously many different configurations that one could conceive of, to produce a tool-holding rack suitable for any particular purpose. For example, carpenters might have one with a built-in table saw and racks for circular saws, sanders, etc. The unit illustrated has mounting brackets for garden tools. Although the mounting brackets could be defined on many conceivable surfaces, the instant invention utilizes a central utility box 24 with a hinged lid 26. The toolbox defines an angle of about 60 degrees with the horizontal when in the stationary resting position shown in FIG. 1. There are brackets provided on almost all surfaces of the box. The bottom, or back, is the only exception. The illustrated embodiment shows a hedge clipper at 28 which fits into one of the top mounting brackets 3, and a weed whip 32 mounted to the lid of the box. Obviously, there is no end to the combination of brackets and tools that can be mounted on such a device.

In the illustrated embodiment, at the rear of the box is mounted a fabric, collapsible container 34. It has collapsible pleats 36, and the texture of the fabric, together with an upper hinged hoop allows the fabric container to be accordioned shut, or pulled open as shown in FIGS. 1 and 3. Additionally, the container is connected to the frame by releasible hooks at the bottom and Velcro(TM) (hook-and-loop fastener material) straps at the top, so it can be removed from the caddy and used in a free-standing mode.

All sides of the container have brackets. When the hinged lid 26 is swung open, as shown in FIG. 4, it exposes racks on the inside of the hinged lid. The inside of the utility box has no brackets, but can be used to store all kinds of loose tools.

The invention thus comprises a product with a thousand uses, usable in about as many trades, and by home owners and others who use tools outdoors. It provides the perfect solution between the choice of gas-powered tools, and the annoying necessity of connecting hundreds of feet of electrical cords together to make the superior, electric-powered tools operative.

I claim:

1. A tool caddy with self-contained electric power, comprising:
   (a) a frame;
   (b) an electric generator mounted in said frame;
   (c) a utility box mounted to said frame and having a plurality of brackets for mounting electric-powered tools;
   (d) two wheels for rolling said frame over the ground and near-ground-level support structure adjacent said wheels to act with said wheels to support said caddy in a stable, upright position such that said utility box is at least partially upright, when said caddy is either being moved, or in its stationary upright position;
   (e) a power cord for extending from said generator to a power tool that would be used in the proximity of said tool caddy; and,
   (f) said utility box resting in said frame at an angle on the order of 60 degrees from the horizontal when in the upright position.

2. The structure according to claim 1 wherein said utility box has a bottom and including a fabric receptacle mounted to said bottom.

3. The structure according to claim 2 wherein said receptacle has accordion pleats to fold up against the bottom of said utility box, or, in the alternative, to expand into an open container to hold trash and the like.

4. The structure according to claim 1 wherein said generator is mounted on a platform supported at the lower end of said frame.

* * * * *